US006442253B1

United States Patent
Onose

(10) Patent No.: US 6,442,253 B1
(45) Date of Patent: Aug. 27, 2002

(54) ISDN TERMINAL APPARATUS

(75) Inventor: Yasuichi Onose, Sakurai (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/290,413

(22) Filed: Apr. 13, 1999

(30) Foreign Application Priority Data

Apr. 14, 1998 (JP) .......................................... 10-103044

(51) Int. Cl.⁷ ............................................ H04M 11/00
(52) U.S. Cl. ............................ 379/100.06; 379/100.05; 358/400
(58) Field of Search .................. 379/100.05, 100.06, 379/100.14–100.17, 100.01, 93.05–93.07; 358/440, 442, 468

(56) References Cited

U.S. PATENT DOCUMENTS

| | | | |
|---|---|---|---|
| 5,050,005 A | * 9/1991 | Kagami | ................. 379/100.15 |
| 5,101,427 A | 3/1992 | Kotani et al. | |
| 5,142,568 A | 8/1992 | Ogata et al. | |
| 5,237,427 A | 8/1993 | Mizutori | |
| 5,260,991 A | 11/1993 | Ikegaya | |
| 5,333,062 A | 7/1994 | Hara et al. | |
| 5,471,317 A | 11/1995 | Charbonnier | |
| 5,481,605 A | 1/1996 | Sakurai et al. | |
| 5,506,891 A | 4/1996 | Brown | |

FOREIGN PATENT DOCUMENTS

| | | |
|---|---|---|
| EP | 0 405 899 A2 | 1/1991 |
| EP | 0 541 087 A1 | 5/1996 |
| EP | 0 749 228 A2 | 12/1996 |
| JP | 2-92141 A | 3/1990 |
| JP | 6-133083 A | 5/1994 |

* cited by examiner

*Primary Examiner*—Wing F. Chan
(74) *Attorney, Agent, or Firm*—Nixon & Vanderhye, P.C.

(57) ABSTRACT

An object of the invention is to provide an ISDN terminal apparatus in which a facsimile and an ISDN interface are integrated and the functions thereof are merged to avoid waste. An ISDN line control unit is disposed between an ISDN line and a facsimile unit. When detecting an occurrence an abnormal condition in the ISDN line, a control CPU of the ISDN line control unit directly transmits the occurrence of the abnormal condition to a CPU of a control unit of the facsimile unit. When detecting an occurrence of an abnormal condition in the facsimile unit, the CPU of the control unit of the facsimile unit directly transmits the occurrence of the abnormal condition to the CPU of the ISDN line control unit. A control panel and a display can be used for both performing settings of the ISDN line control unit and operating the facsimile unit. Since an automatic answering and recording unit is controlled by the ISDN line control unit, a facsimile communication and telephone automatic answering and recording can simultaneously be performed by using the two lines of the ISDN line.

7 Claims, 5 Drawing Sheets

ISDN TERMINAL APPARATUS

BACKGROUND OF THE INVENTION

1. Field of the Invention

The present invention relates to an ISDN (integrated services digital network) terminal apparatus which is connected to the ISDN line for use and allows a facsimile apparatus which is designed to be connected to the public switched telephone network line for use, to be connected to the ISDN line for use.

2. Description of the Related Art

Recently, the number of ISDN subscribers has been increased as the Internet is popularized and the transmission speed increases. FIG. 4 shows a use condition of an ISDN line 1. An ISDN subscriber's telephone apparatus 2, facsimile apparatus 3 or personal computer 4 can be connected to the ISDN line 1 through a terminal adapter (hereinafter referred to as "TA") 5 and a digital service unit (hereinafter referred to as "DSU") 6. A TA in which the function of the DSU 6 is incorporated has been commercialized. An apparatus has also been commercialized that is provided with an analog port for allowing a facsimile apparatus and a cordless telephone apparatus which have been used for the public switched telephone network line, to be connected to the ISDN line 1. A G4 facsimile apparatus which is developed specifically for the ISDN line is available. However, the G4 facsimile apparatus has not widely penetrated in the home consumer market because the G4 facsimile apparatus is large in size and expensive.

The G3 facsimile apparatus 3 as shown in FIG. 4 has an interface for connecting the facsimile apparatus 3 to the public switched telephone network line. The facsimile apparatus 3 cannot directly be connected to the ISDN line 1 because the interface for the ISDN line 1 is different, and accordingly the TA5 and the DSU 6 are necessary. To the TA provided with a terminal called an analog port, conventional apparatuses designed for the public switched telephone network line can be connected. The analog port is provided with the function of an exchange and is capable of operating conventional apparatuses designed for the public switched telephone network line.

FIG. 5 shows a schematic configuration of an analog port 10. The analog port 10 has the function of an exchange for the public switched telephone network line. An exchange for the public switched telephone network line comprises a call signal generating circuit, an off-hook detecting circuit for detecting that the handset is lifted, an office voltage supplying circuit and a polarity-reversing circuit. When the calling party's handset is lifted, the line thereof is closed and current flows through the line, so that the exchange detects that the handset is lifted and sends out a dial tone. The calling party sends out a dial number by means of tones or pulses. Recognizing this, the exchange specifies the called party's line. The exchange then checks the line and when the line is not busy, outputs a call signal of a voltage of 75 V. By the call signal, the called party's telephone rings. The exchange sends a ringback tone to the calling party to inform the calling party that the called party's telephone apparatus is ringing. When the called party's handset is lifted, the line is closed, whereby the exchange recognizes that the handset is lifted. This recognition stops the transmission of the call signal to the called party and the transmission of the ringback tone to the calling party, and the telephone line is connected, so that a telephone conversation can be performed.

The exchange has other various functions and the facsimile apparatus is designed to operate in accordance with the functions. Therefore, the analog port 10 is designed to provide these functions. The analog port 10 of FIG. 5 has a call signal generating circuit 11 for generating a call signal having an amplitude of a voltage of as high as 75 V and issues a signal in a cycle of 16 Hz. A codec/tone generating circuit 12 performs a codec operation of converting analog signals such as voice into digital signals to transmit the digital signals to the ISDN line 1 and converting digital signals received from the ISDN line 1 into analog signals, and an operation of generating a tone signal of a specific frequency in response to a specific digital signal received through the ISDN line 1. A line current supplying/polarity-reversing circuit 13 performs the functions of the office voltage supplying circuit and the polarity-reversing circuit for the telephone apparatus 2 and the facsimile apparatus 3 for the public switched telephone network line. A line current detecting circuit 14 determines whether the handset is lifted off the hook or not by detecting that an off-hook operation of lifting the handset of the telephone apparatus 2 closes the line to increase the current supplied from the line current supplying/polarity-reversing circuit 13. The office voltage supplied from the line current supplying/polarity-reversing circuit 13 through the line current detecting circuit 14 is directed out through an analog port output terminal 15. By connecting the telephone apparatus 2 or the facsimile apparatus 3 designed for the public switched telephone network line to the analog port output terminal 15, the telephone apparatus 2 or the facsimile apparatus 3 can be operated similarly to the case in which a conventional apparatus is connected to the exchange.

As shown in FIG. 4, in order for a subscriber of the ISDN line 1 to connect the telephone apparatus 2, facsimile apparatus 3 or personal computer 4 designed for the public switched telephone network line to the ISDN line 1, it is necessary to use a TA or DSU having the analog port 10. Therefore, extra parts are necessary, extra power is consumed and as well the advantage of the function of the ISDN line 1 cannot be fully taken, so that the ISDN line is an inconvenient and expensive item for the ISDN subscriber. When the telephone apparatus 2, the facsimile apparatus 3 or the personal computer 4 is the calling party, a dial number is sent out by means of tones or pulses. It is necessary for the analog port 10 to recognize the dial number by means of tones or pulses and to specify the called party's line. Since the exchange has functions other than this and the facsimile apparatus 3 is designed to operate in accordance with these functions, it is necessary to design the analog port 10 so as to provide the functions of the exchange. Moreover, the G3 facsimile apparatus operates while monitoring the occurrence of abnormal conditions of the apparatus and the line with an incorporated CPU. For example, on the called party's side, reception is performed while monitoring the signal level of the reception signal, and when the signal terminates, it is determined whether the signal terminates normally or due to an instantaneous chopping. When it is determined that the signal terminates normally, the apparatus performs the next operation. When it is determined that the signal terminates due to an instantaneous chopping, the monitoring of the signal is continued, and when the signal comes again, the reception is continued. When the signal absence is continued, a processing to be performed when an abnormal condition occurs in the line is performed.

In the case of the ISDN line 1, the line condition is normally monitored by a different block and cannot be monitored by the signal output to the analog port 10. Therefore, when an abnormal condition occurs, a processing similar to that performed in the case of the public switched telephone network line must be performed through the analog port output terminal 15 to stop the operation. For example, the signal is stopped or the polarity of the line voltage is reversed to stop the operation of the facsimile apparatus 3. Since the output condition of the analog port output terminal 15 is changed after the occurrence of an abnormal condition is detected and a processing to handle the abnormal condition is performed as described above, a delay is caused in the operation, so that useless holding of the line occurs.

Prior art associated with performing facsimile communications and digital data communications or telephone communications by use of the ISDN line is disclosed, for example, in Japanese Unexamined Patent Publications JP-A 2-92141(1990) and JP-A 6-133083(1994). JP-A 2-92141 discloses a prior art in which when a call arrives, whether the call is a facsimile communication or a telephone communication is determined and the processing to be performed after a call arrives is switched based on the result of the determination. JP-A 6-133083 discloses a prior art associated with, when a telephone apparatus or the like designed for the public switched telephone network line is connected to the ISDN, supplying power to the telephone apparatus even during a power failure. The prior arts of JP-A 2-92141 and JP-A 6-133083 in which the functions of the facsimile apparatus and the ISDN interface are completely separated have not yet reached a point where waste is avoided by integrating the functions.

SUMMARY OF THE INVENTION

An object of the invention is to provide an ISDN terminal apparatus in which a facsimile and an ISDN interface are integrated and the functions thereof are merged to avoid waste.

The invention provides an ISDN terminal apparatus comprising a facsimile communication unit; a facsimile control unit; a telephone communication function unit; and an ISDN line control unit for establishing connection to an ISDN line and performing data conversion, wherein the ISDN line control unit is provided with an ISDN line monitoring unit for monitoring a communication condition of the ISDN line and when detecting an occurrence of an abnormal condition in the ISDN line, transmitting the occurrence of the abnormal condition to the facsimile control unit.

According to the invention, the ISDN line control unit establishes connection to the ISDN line and performs data conversion, and has the ISDN monitoring unit. The ISDN line monitoring unit monitors the communication condition of the ISDN line and when detecting the occurrence of an abnormal condition, transmits the occurrence of the abnormal condition to the facsimile control unit. Since the occurrence of an abnormal condition in the ISDN line is directly transmitted to the facsimile control unit, a communication operation or the like can be promptly stopped. While in the conventional analog port, it is necessary to stop the signal to the analog port by stopping the operation of the codec or to reverse the polarity of the line current supplying/polarity-reversing circuit, in the invention, transmission can be promptly performed with fewer parts. As described above, according to the invention, since the occurrence of an abnormal condition in the ISDN line is transmitted to the facsimile control unit immediately after the occurrence of the abnormal condition is detected, the facsimile communication operation can be promptly stopped, so that the number of parts and the price of the apparatus are reduced.

The invention provides an ISDN terminal apparatus comprising a facsimile communication unit; a facsimile control unit; a telephone communication function unit; and an ISDN line control unit for establishing connection to an ISDN line and performing data conversion, wherein the facsimile control unit is provided with an apparatus operation monitoring unit for monitoring an operation condition of a facsimile function unit and when detecting an occurrence of an abnormal condition in the facsimile function unit, transmitting the occurrence of the abnormal condition to the ISDN line control unit.

According to the invention, the apparatus operation monitoring unit of the facsimile control unit monitors the operation condition of the facsimile function unit and when detecting the occurrence of an abnormal condition, transmits the occurrence of the abnormal condition to the ISDN line control unit. Consequently, the ISDN line control unit can promptly break the connection to the ISDN line when an abnormal condition occurs in the apparatus. Between apparatuses connected by the conventional analog port, it is necessary to make it possible to detect that an apparatus breaks the connection to the line by continuously flowing current to the connected line. This wastes power and necessitates extra parts for making the detection possible, so that the apparatus becomes expensive. As described above, according to the invention, when an abnormal condition occurs in the facsimile function unit, the occurrence of the abnormal condition in the apparatus is transmitted to the ISDN line control unit, so that the connection to the ISDN line can be broken immediately after the abnormal condition occurs in the apparatus.

The invention provides an ISDN terminal apparatus comprising a facsimile communication unit; a facsimile control unit; a telephone communication function unit; and an ISDN line control unit for establishing connection to an ISDN line and performing data conversion, wherein the ISDN line control unit comprises an incoming call detection unit for detecting an incoming call from the ISDN line; an incoming call determination unit for determining whether the incoming call detected by the incoming call detection unit is related to telephone or facsimile; and a transmission unit for transmitting information representative of the presence of the incoming call to the facsimile control unit when the incoming call determination unit determines that the incoming call is related to telephone or facsimile.

According to the invention, the ISDN line control unit has the incoming call detection unit, the incoming call determination unit and the transmission unit. The incoming call detection unit detects an incoming call from the ISDN line. The incoming call determination unit determines whether the detected incoming call is related to telephone or facsimile. When it is determined that the incoming call is related to telephone or facsimile, the transmission unit transmits information representative of the presence of the incoming call to the facsimile control unit. The facsimile control unit rings a buzzer or provides a melody so that the user can be informed of the arrival of the incoming call. In the conventional analog port, since a bell or the like is rung after an incoming call is detected, it is necessary to output a call signal to an output terminal or the like by the analog port and it is also necessary to provide a call signal generating circuit or the like for generating a call signal of 16 Hz at a voltage of as high as 75 V, so that the apparatus becomes expensive. When the incoming call is related to neither telephone nor facsimile, since it is unnecessary for a facsimile apparatus to receive the call, it is unnecessary to ring the bell. As described above, according to the invention, when a call comes from the ISDN line, an incoming signal is transmitted to the facsimile control unit, so that the ISDN subscriber, etc. can be promptly informed of the arrival of the incoming call.

In the invention it is preferable that information transfer between the ISDN line control unit and the facsimile control unit is performed by use of serial transmission.

According to the invention, since information transfer between the ISDN line control unit and the facsimile control unit is performed by use of serial transmission, wiring can be reduced. As described above, according to the invention, information transfer between the facsimile control unit and the ISDN control unit can be effectively performed by use of serial transmission.

In the invention it is preferable that an operation unit is provided for performing settings and operations associated with ISDN communications and facsimile communications.

According to the invention, parameter setting and the like for establishing connection to the ISDN line can be performed by use of the operation unit such as an operation panel, so that the apparatus can be made easy to use. By providing a display on the operation unit, the set values and the like can be confirmed, so that the apparatus becomes more convenient. Conventionally, it is necessary to perform setting by use of a push button or the like of the telephone apparatus connected through the analog port, and a display for confirming the settings is not provided, which is inconvenient. As described above, according to the invention, various settings for ISDN communications and various settings for facsimile communications can be performed from the operation unit in a unified manner, so that the apparatus can be made convenient and easy to use.

In the invention it is preferable that the operation unit is controlled by the ISDN line control unit.

According to the invention, since the operation unit is controlled by the ISDN line control unit, a call can be placed even during a power failure, the use condition of the two lines of the ISDN line and the apparatus condition can be displayed, and as well setting conditions of the facsimile function unit can be displayed and a call originating operation as a facsimile apparatus can be performed.

Also the invention provides an ISDN terminal apparatus comprising a facsimile communication unit; a facsimile control unit; a telephone communication function unit; and an ISDN line control unit for establishing connection to an ISDN line and performing data conversion, the ISDN terminal apparatus further comprising an automatic answering and recording unit capable of recording sound signals for telephone communications through the ISDN line independently of facsimile communications.

According to the invention, since the automatic answering and recording unit is capable of recording sound signals for telephone communications through the ISDN line independently of facsimile communications, the automatic answering and recording operation can be performed even when a telephone call arrives during facsimile transmission or reception. As described above, according to the invention, by the automatic answering and recording unit, automatic recording of sound signals for telephone communications can be performed even during a facsimile communication.

Also the invention provides an ISDN terminal apparatus comprising a facsimile communication unit; a facsimile control unit; a telephone communication function unit; and an ISDN line control unit for establishing connection to an ISDN line and performing data conversion, the ISDN terminal apparatus further comprising an automatic answering and recording unit for recording sound signals for telephone communications through the ISDN line only when the sound signals are of a voice or audio band of 3.1 kHz.

According to the invention, since the automatic answering and recording unit records sound signals for telephone communications through the ISDN line only when the sound signals are of a voice or audio band of 3.1 kHz, the automatic answering and recording function can be prevented from operating when the received call is a personal computer communication. As described above, according to the invention, in a case where a wrong number is dialed to perform a non-voice communication such as a personal computer communication and such a call is received, although even such a call is automatically recorded when automatic answering and recording is set in conventional terminal apparatuses, such a wrong number call is not recorded in the ISDN terminal apparatus of the invention because the automatic answering and recording unit that records only voice or sound signals of an audio band of 3.1 kHz is provided.

The invention provides an ISDN terminal apparatus comprising a facsimile communication unit; a facsimile control unit; a telephone communication function unit; and an ISDN line control unit for establishing connection to an ISDN line and performing data conversion, the ISDN terminal apparatus further comprising an automatic answering and recording unit for recording sound signals for telephone communications through the ISDN line, wherein the ISDN line control unit has an automatic answering and recording control unit for controlling the operation of the automatic answering and recording unit.

According to the invention, since the ISDN line can be used as two lines, automatic answering and recording can be performed even during facsimile transmission or reception. Since the operation of the automatic answering and recording unit is controlled by the automatic answering and recording control unit of the ISDN line control unit, the automatic answering and recording operation can be controlled even during a facsimile communication. As described above, according to the invention, since the operation of the automatic answering and recording unit is controlled by the automatic answering and recording control unit of the ISDN line control unit, even during a facsimile communication over one of the two lines of the ISDN line, telephone signals through the other line can be automatically recorded.

The invention provides an ISDN terminal apparatus comprising a facsimile communication unit; a facsimile control unit; a telephone communication function unit; and an ISDN line control unit for establishing connection to an ISDN line and performing data conversion, wherein the facsimile control unit has a hook switch monitoring unit for monitoring an actuation condition of a hook switch for telephone and transmitting the actuation condition to the ISDN line control unit in a predetermined cycle and at a time of the occurrence of a change.

According to the invention, since the facsimile control unit has the hook switch monitoring unit for monitoring the actuation condition of the hook switch for telephone and transmitting the actuation condition to the ISDN line control unit in a predetermine cycle and at a time of the occurrence of a change, it is unnecessary to transmit a high-voltage call signal from the analog port or the like, so that power consumption can be reduced. As described above, according to the invention, by directly transmitting the actuation condition of the hook switch to the ISDN line control unit, connection and the like associated with the ISDN line can be promptly controlled in accordance with the actuation condition of the hook switch.

The invention provides an ISDN terminal apparatus comprising a facsimile communication unit; a facsimile control unit; a telephone communication function unit; and an ISDN line control unit for establishing connection to an ISDN line and performing data conversion, the ISDN terminal apparatus further comprising a cordless telephone connecting device, wherein the ISDN line control unit has a cordless control unit for controlling the cordless telephone connecting device.

According to the invention, since the cordless telephone connecting device is controlled by the cordless control unit of the ISDN line control unit, even during a facsimile communication over one of the two lines of the ISDN line, a telephone communication can be performed by connecting the other line to a cordless telephone apparatus. As described above, according to the invention, since the cordless telephone connecting device is controlled by the cordless control unit of the ISDN line control unit, even during a facsimile communication by use of one of the two lines of the ISDN line, a telephone communication using a cordless telephone apparatus can be performed by use of the other line.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
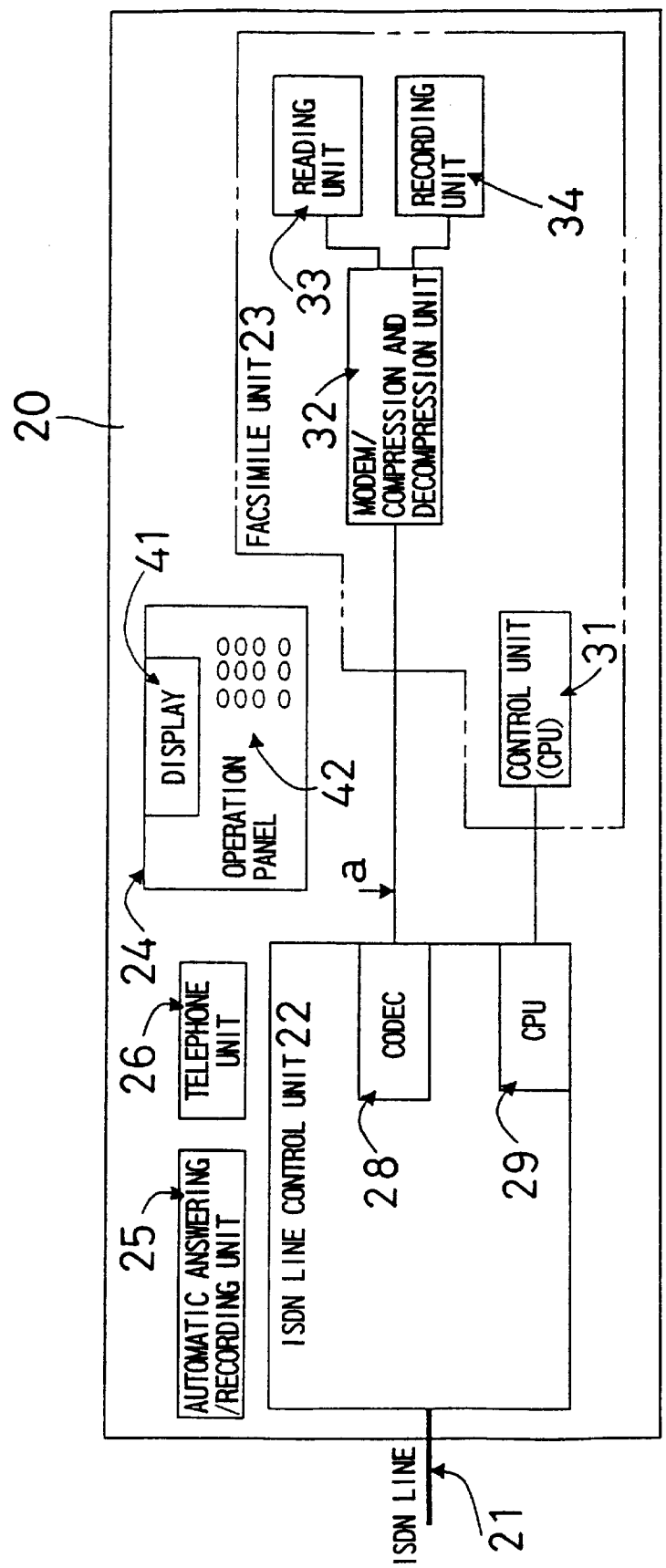
FIG. 1 is a block diagram showing a schematic electric configuration of a first embodiment of the invention.

Now referring to the drawings, preferred embodiments of the invention are described below.

Figure 4:
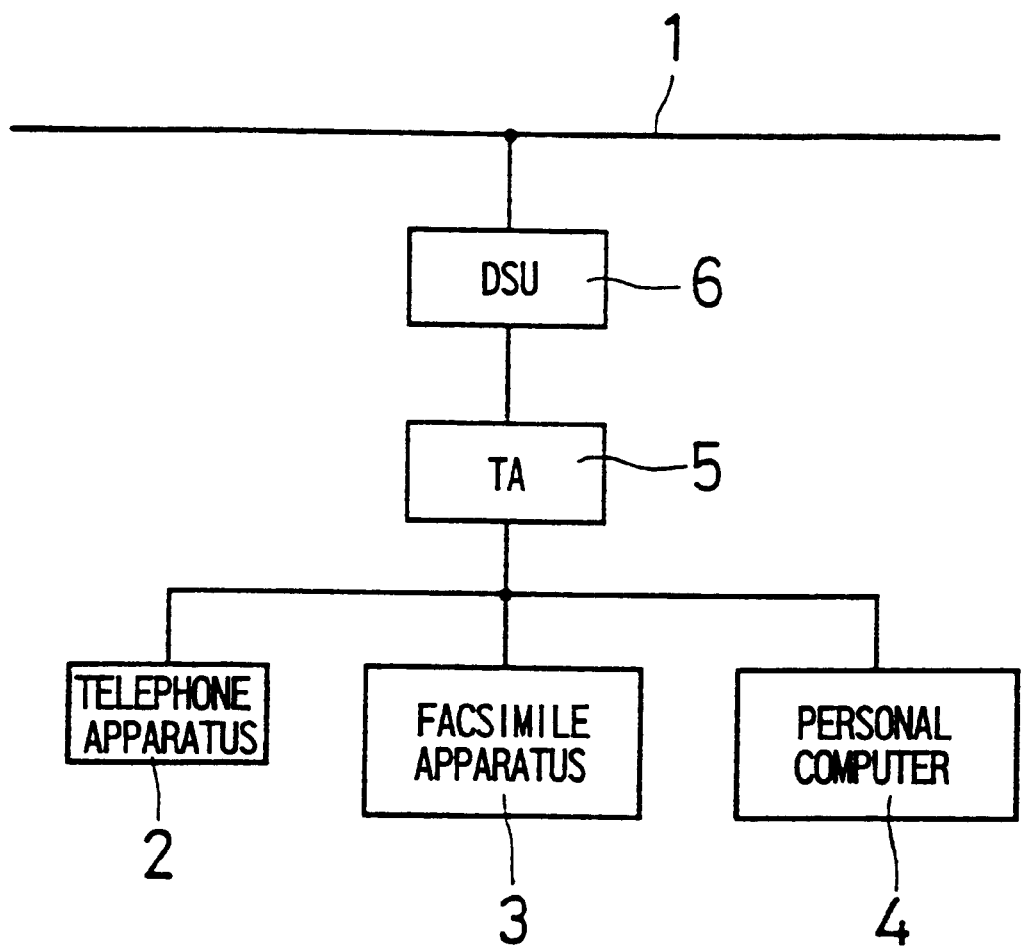
FIG. 4 is a block diagram showing the conventional condition of connection to the ISDN line.
Figure 5:
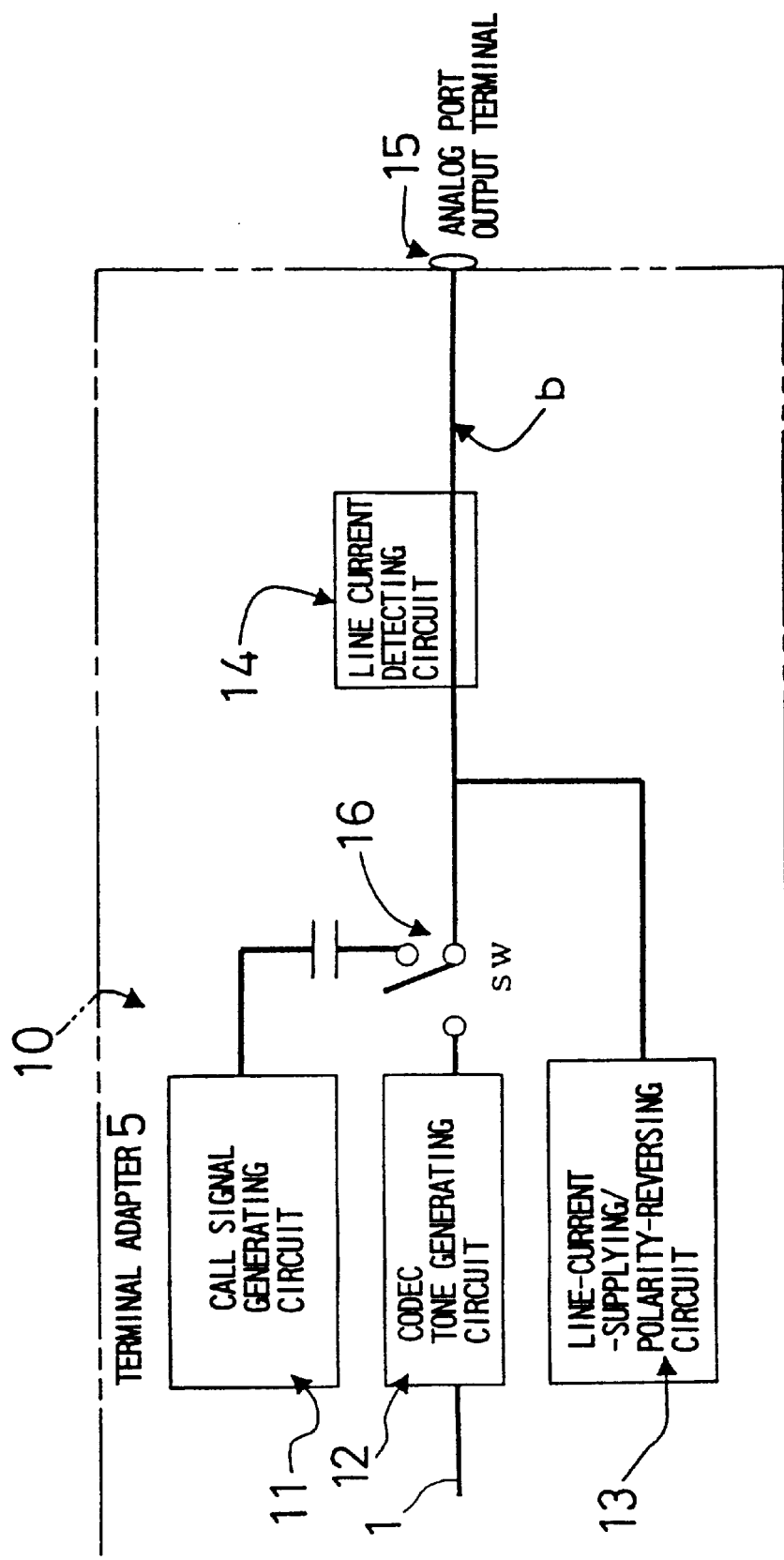
FIG. 5 is a block diagram showing the schematic electric configuration of an analog port 10 provided in a TA 5 and a DSU 6 of FIG. 4.

FIG. 1 shows a schematic electric configuration of an ISDN terminal apparatus 20 according to a first embodiment of the invention. In the ISDN terminal apparatus 20, the functions of the facsimile apparatus 3, the TA 5 and the DSU 6 shown in FIG. 4 are integrated, and particularly, the function of the analog port 10 as shown in FIG. 5 is simplified and the operation efficiency of the analog port 10 is improved. The ISDN terminal apparatus 20 comprises an ISDN line control unit 22 connected to an ISDN line 21, a facsimile unit 23 for performing facsimile transmission and reception according to the G3 standard, an operation unit 24 for performing settings of the ISDN line control unit 22 and operating the facsimile unit 23, an automatic answering and recording unit 25 for recording a telephone signal received through the ISDN line 21, and a telephone unit 26 for enabling a telephone call.

The ISDN line control unit 22 has the DSU function and the TA function. Signals input from the ISDN line 21 undergo a processing conforming to TTC Standards (JT-G961, JT-I430 and JT-Q921) and to ITU-T Recommendations (I.430 and Q921) at the ISDN line control unit 22, and are divided into data of the B1 channel, the B2 channel and the D channel provided by the ISDN line. The ISDN line control unit 22 includes a codec 28 and a CPU 29. The codec 28 is provided for converting sound signals for telephone communications and analog signals for facsimile communications into digital signals to transmit the digital signals to the ISDN line 21 and for converting digital signals received from the ISDN line 21 into analog signals. The CPU 29 performs control for establishing connection to the ISDN line 21. The D-channel data are processed by the CPU 29, whereas the B1-channel and the B2-channel data are supplied to the facsimile unit 23 or the telephone unit 26. It is possible for the B1 and the B2 channels to handle sound signals and digital signals independently of each other. While the telephone unit 26 is connected and only sound signals are handled in this embodiment, the ISDN terminal apparatus 20 is usable for digital data communications by use of a personal computer or the like by providing an interface to a personal computer or the like.

When a call comes from the side of the ISDN line 21, the ISDN line control unit 22 performs a predetermined processing and determines whether the information transferred from the transmission circuit network through the ISDN line 21 is voice information, a signal of an audio band of 3.1 kHz or nonrestrictive digital information for personal computer communications or the like. When the transferred information is a sound signal or a facsimile signal (not G4), the ISDN line control unit 22 determines that a call arrives and rings the bell of the telephone unit 26 or the facsimile unit 23. When the telephone apparatus is connected to the public switched telephone network line, the bell of the telephone apparatus can be rung by a calling on the line, whereas in the case of the ISDN line 21, the determination is made based on information included in a signal from the transmission circuit network and when the transferred information is a voice signal or a signal of an audio band of 3.1 kHz, the bell is rung. In the case of the analog port 10 as shown in FIG. 5, the call signal generating circuit 11 that outputs a signal the same as the call signal for the public switched telephone network line is provided and the signal is output to an apparatus connected to the analog port output terminal 15. In the ISDN terminal apparatus 20 of this embodiment, taking the advantage of the integration, the bell is controlled so as to be rung not by the call signal itself but by transmitting information.

The facsimile unit 23 is provided with a control unit 31 including a CPU to control the entire facsimile unit 23. In the ISDN terminal apparatus 20 of this embodiment, taking the advantage of the integration, the bell is rung not by the call signal itself but by transmitting information representing that a call signal is received. The control unit 31 of the facsimile unit 23 controls the bell of the telephone unit 26 so as to be rung by receiving incoming call information. That is, the CPU of the control unit 31 of the facsimile unit 23 controls the bell of the telephone unit 26 so as to ring when incoming call information is received. When the bell rings, the user lifts the handset of the telephone unit 26, or the automatic answering and recording unit 25 or the facsimile unit 23 operates to seize the line. At this time, no signal has yet been output to a signal line a for signal transmission from the codec 28 to the facsimile unit 23.

The seizure of the line is controlled by the CPU of the control unit 31 of the facsimile unit 23. For example, to start facsimile reception, the CPU 29 of the ISDN line control unit 22 is informed of the seizure of the line and a modem/compression and decompression unit 32 included in the facsimile unit 23 is brought to reception state. The ISDN line control unit 22 connects the line by a communication with the transmission circuit network through the ISDN line 21. When the connection is completed, data from the transmission circuit network are converted into analog signals by the codec 28 and the analog signals are output to the facsimile unit 23. Signals from the facsimile unit 23 are converted into digital signals by the codec and the digital signals are transmitted to the transmission circuit network. When the analog port 10 as shown in FIG. 5 is used, first, the line current detecting circuit 14 confirms that no current is flowing through a line b. Then, a selection switch 16 of FIG. 5 is connected to the call signal generating circuit 11 to output a call signal, so that the bell of an apparatus such as a telephone apparatus connected to the line b rings. When the telephone apparatus or the facsimile apparatus seizes the line b, current flows through the line b. This is detected by the line current detecting circuit 14, so that the control unit switches the selection switch 16 from a position 2 to a position 1. With this, connection to the terminal connected to the analog port 10 is completed.

In the analog port 10 of FIG. 5, when the line b is connected, a communication or a telephone conversation is performed. When an abnormal condition such as a temporary error due to noise or an unrecoverable error occurs in the ISDN line 1, it is necessary for the apparatus to promptly handle the abnormal condition. When an abnormal condition such as a paper jam occurs in the facsimile apparatus, it is necessary to promptly disconnect the line. To do so, in the ISDN terminal apparatus 20 of this embodiment, information on an abnormal condition occurring in the line and information on an abnormal condition occurring in the apparatus are communicated between the ISDN line control unit 22 and the facsimile unit 23 to thereby increase the processing speed.

When the analog port 10 as shown in FIG. 5 is used, the occurrence of an abnormal condition in the ISDN line 1 cannot be directly transmitted to the facsimile apparatus but the occurrence of the abnormal condition is transmitted by causing a signal absence condition in which the signal for the line b is stopped or by reversing the polarity of the voltage supplied from the line current supplying/polarity-reversing circuit 13. For this reason, extra time is necessary for monitoring, and it is impossible to promptly respond to the occurrence of an abnormal condition and a processing circuit for that purpose is necessary.

In this embodiment, in a case where a call is originated from the facsimile unit 23 or the telephone unit 26, when the handset is lifted, a dial tone is transmitted from the ISDN line control unit 22 or the facsimile unit 23 to the telephone unit 26 to notify that a call can be made. A telephone number is input from a keyboard of the operation unit 24, and the origination of a call is started by depressing a start button provided in the operation unit 24 or judging the end of input of the telephone number by means of a program. In the case of the ISDN line 21, since the telephone number is sent out in one transmission as data, a signal representative of the end of the telephone number is necessary.

While the called party is being called, a ringback tone is sent out to the telephone apparatus by the ISDN line control unit 22 or the control unit 31 of the facsimile unit 23. When the ISDN control unit 22 judges the completion of the connection through a communication with the transmission circuit network, the facsimile unit 23 is notified of the completion of the connection, and transmission and reception signals are digital-to-analog converted by the codec 28 to perform a telephone conversation.

In the case of the analog port 10 shown in FIG. 5, that the handset is lifted is detected by the line current detecting circuit 13, and the telephone number is detected based on the tones or the dial pulses output from the telephone apparatus. For this reason, it is necessary for the TA, etc. to have a DTMF receiver or a dial pulse recognizing circuit. Thus, the TA, etc. must act as an exchange when a conventional apparatus is connected to the ISDN line 1. For this reason, the TA, etc. must include many parts and follow a control procedure, so that the TA, etc. are inefficient and expensive devices. In the invention, to solve this problem, the facsimile unit 23 and the ISDN line control unit 22 are integrated, information is exchanged between the CPU 29 and the control unit 31, and the blocks are controlled by the appropriately decommissioned CPUs, so that waste of communication time, power and parts can be reduced.

The modem/compression and decompression unit 32 performs compression and decompression of facsimile signals conforming to the G3 standard, modulation for transmitting facsimile signals to the public switched network line and demodulation of facsimile signals received from the public switched network line. A reading unit 33 performs optical reading of facsimile originals. A recording unit 34 prints out received facsimile data.

The operation unit 24 includes a display 41 such as a liquid crystal display device and an operation panel 42. The operation panel 42 is provided with a plurality of keyboards and operation switches. From the operation panel 42, various settings for ISDN communications and various settings associated with facsimile communications can be performed in a unified manner while watching the display 41.

Figure 2:
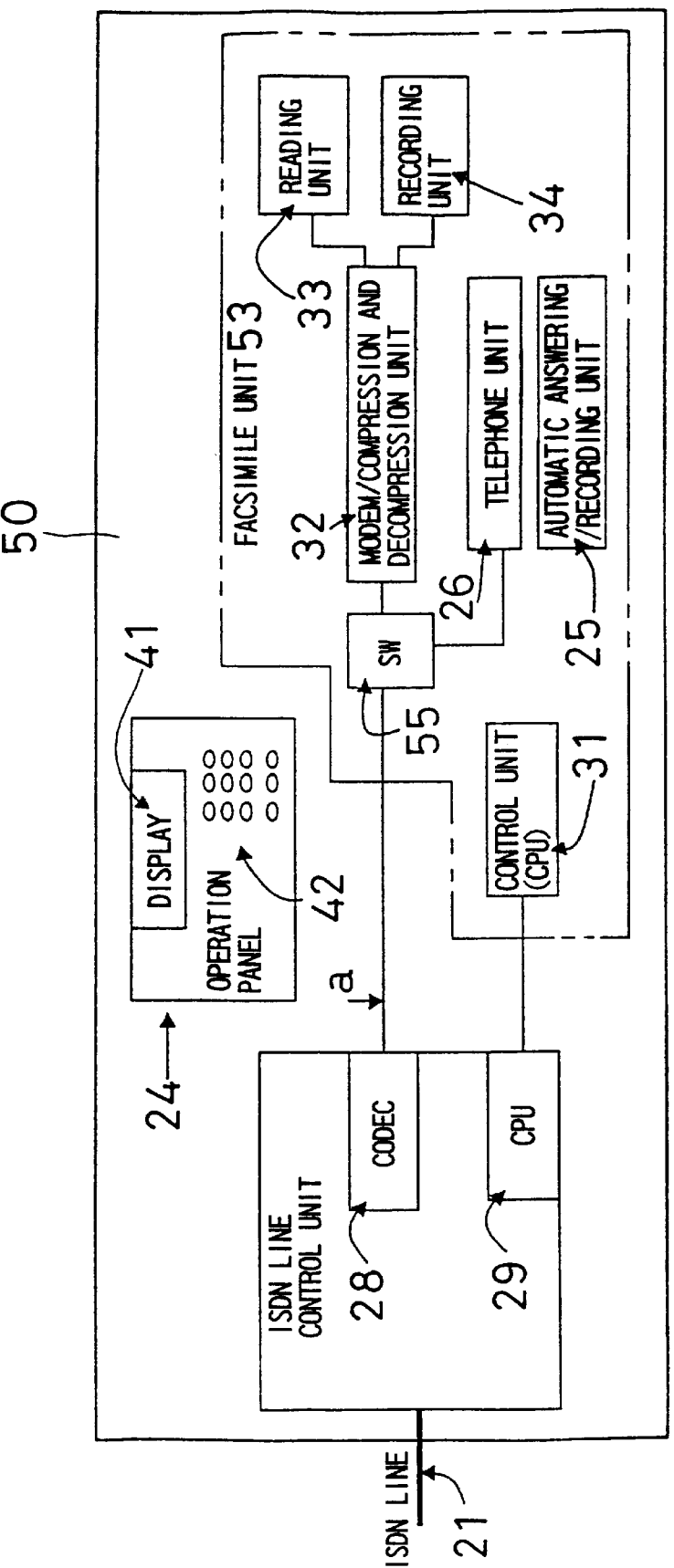
FIG. 2 is a block diagram showing a schematic electric configuration of a second embodiment of the invention.

FIG. 2 shows a schematic electric configuration of an ISDN terminal apparatus 50 of a second embodiment of the invention. In the ISDN terminal apparatus 50 of this embodiment, corresponding parts to those of the ISDN terminal apparatus 20 shown in FIG. 1 are designated by the same reference numerals and no overlapping descriptions will be given. In the ISDN terminal apparatus 50 of this embodiment, a facsimile unit 53 is provided with the automatic answering and recording unit 25 and the telephone unit 26 and control is performed by the control unit 31 of the facsimile unit 23. A selection switch SW (hereinafter, sometimes referred to as "SW") 55 is provided between the telephone unit 26 and the modem/compression and decompression unit 32. When a signal received from the ISDN line 21 is a telephone or a facsimile communication, the CPU 29 of the ISDN line control unit 22 transmits the information to the control unit 31. The control unit 31 determines whether the reception signal converted into an analog signal by the codec 28 is a facsimile signal or a telephone signal, switches the SW 55 and performs facsimile or telephone processing.

Figure 3:
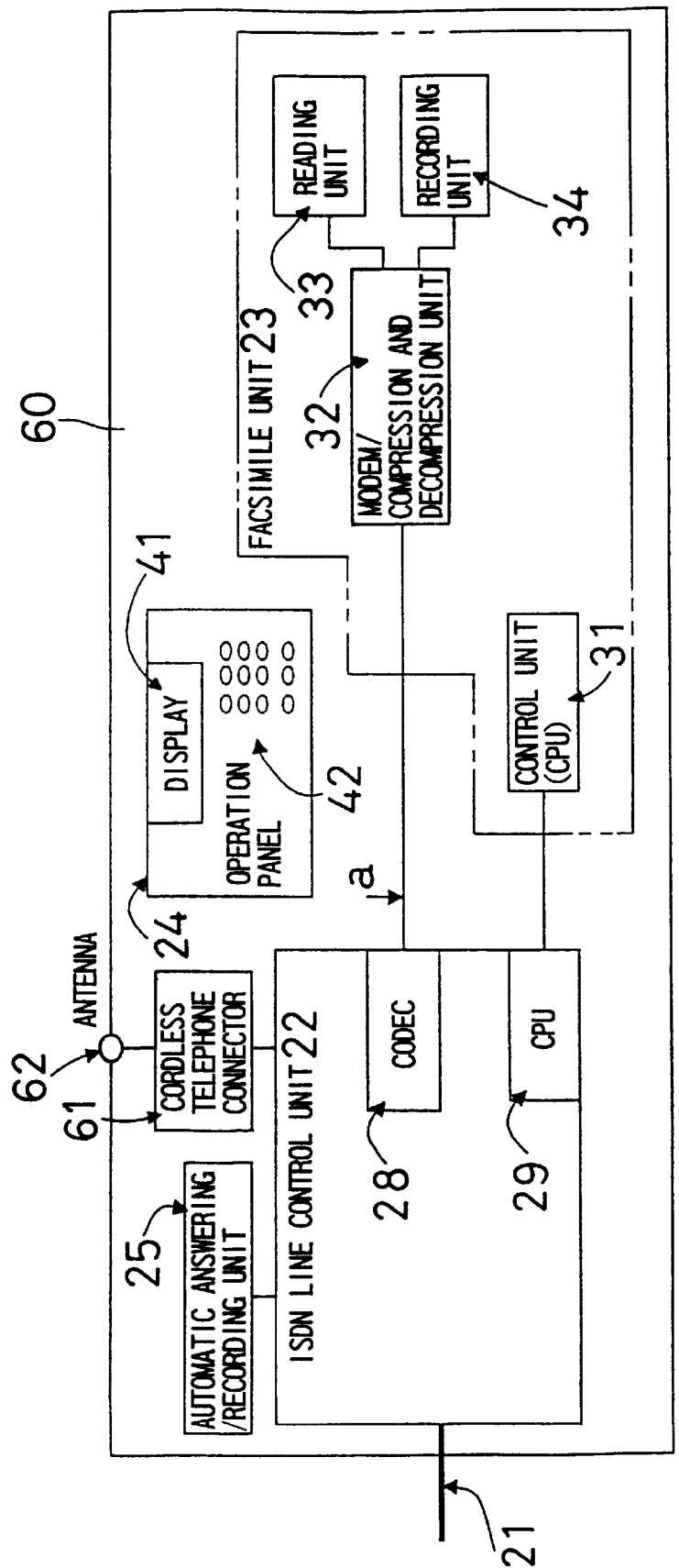
FIG. 3 is a block diagram showing a schematic electric configuration of a third embodiment of the invention.

FIG. 3 shows a schematic electric configuration of an ISDN terminal apparatus 60 of a third embodiment of the invention. In the ISDN terminal apparatus 60 of this embodiment, corresponding parts to those of the ISDN terminal apparatuses 20 and 50 of FIGS. 1 and 2 are designated by the same reference numerals and no overlapping descriptions will be given. The ISDN terminal apparatus 60 of this embodiment incorporates a cordless telephone connecting device 61 and is capable of communicating with a cordless telephone apparatus through an antenna 62. That is, it can be considered that the cordless telephone connecting device 61 is connected instead of the telephone unit 26 of the ISDN terminal apparatus 20 of the first embodiment of FIG. 1.

While the above-described embodiments are provided with the automatic answering and recording unit 25 and the telephone unit 26 or the cordless telephone connecting device 61, the invention is applicable to a case in which only the facsimile unit 23 is provided. Moreover, a circuit for interfacing with a personal computer may be incorporated so that the internet can be used. In the first and the third embodiments of the invention, since the automatic answering and recording unit 25 is controlled by the ISDN line control unit 22, a facsimile communication and automatic answering and recording can be performed in parallel.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An ISDN terminal apparatus comprising:

a facsimile communication unit;

a facsimile control unit;

a telephone communication function unit; and an ISDN line control unit for establishing connection to an ISDN line and performing data conversion, wherein the ISDN line control unit is provided with an ISDN line monitoring unit for monitoring a communication condition of the ISDN line and when detecting an occurrence of an abnormal condition in the ISDN line, transmitting the occurrence of the abnormal condition to the facsimile control unit.

2. The ISDN terminal apparatus of claim 1, wherein an operation unit is provided for performing settings and operations associated with ISDN communications and facsimile communications.

3. The ISDN terminal apparatus of claim 2 wherein the operation unit is controlled by the ISDN line control unit.

4. The ISDN terminal apparatus of claim 1, wherein information transfer between the ISDN line control unit and the facsimile control unit is performed by use of serial transmission.

5. An ISDN terminal apparatus comprising:

a facsimile communication unit;

a facsimile control unit;

a telephone communication function unit; and an ISDN line control unit for establishing connection to an ISDN line and performing data conversion, wherein the facsimile control unit is provided with an apparatus operation monitoring unit for monitoring an operation condition of a facsimile function unit and when detecting an occurrence of an abnormal condition in the facsimile function unit, transmitting the occurrence of the abnormal condition to the ISDN line control unit.

6. The ISDN terminal apparatus of claim 5, wherein information transfer between the ISDN line control unit and the facsimile control unit is performed by use of serial transmission.

7. The ISDN terminal apparatus of claim 5, wherein an operation unit is provided for performing settings and operations associated with ISDN communications and facsimile communications.

* * * * *